(12) United States Patent
Wu

(10) Patent No.: US 8,717,296 B2
(45) Date of Patent: May 6, 2014

(54) MOUSE WITH DETACHABLE COVER

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 252 days.

(21) Appl. No.: 13/416,659

(22) Filed: Mar. 9, 2012

(65) Prior Publication Data

US 2013/0135806 A1 May 30, 2013

(30) Foreign Application Priority Data

Nov. 25, 2011 (TW) .............................. 100143436 A

(51) Int. Cl.
*G06F 3/033* (2013.01)
*G09G 5/08* (2006.01)

(52) U.S. Cl.
USPC ...................................... 345/163; 361/679.01

(58) Field of Classification Search
USPC ...................................... 361/679.02; 345/163
See application file for complete search history.

(56) References Cited

U.S. PATENT DOCUMENTS

| 6,225,981 | B1* | 5/2001 | Lu | 345/164 |
| 7,119,793 | B2* | 10/2006 | Chen | 345/166 |
| 7,714,841 | B2* | 5/2010 | Yen | 345/163 |
| 8,049,725 | B2* | 11/2011 | Chang | 345/163 |
| 8,077,150 | B2* | 12/2011 | Wu | 345/163 |
| 2006/0038779 | A1* | 2/2006 | Li | 345/163 |
| 2006/0209025 | A1* | 9/2006 | Cheng et al. | 345/163 |
| 2007/0211029 | A1* | 9/2007 | Chiang et al. | 345/163 |
| 2008/0030469 | A1* | 2/2008 | Yen et al. | 345/163 |
| 2008/0192009 | A1* | 8/2008 | Wu et al. | 345/163 |
| 2008/0266259 | A1* | 10/2008 | Chiang et al. | 345/163 |
| 2009/0174659 | A1* | 7/2009 | Chiang et al. | 345/163 |

\* cited by examiner

*Primary Examiner* — Lisa Lea Edmonds
(74) *Attorney, Agent, or Firm* — Kirton McConkie; Evan R. Witt

(57) ABSTRACT

A mouse includes a main body, an engaging device, and a detachable cover. The main body has a top surface and an insertion slot. The insertion slot is recessed from the top surface of the main body. The cover is used for detachably covering the top surface of the main body. The cover has an extension arm. After the top surface of the main body is covered by the cover, the extension arm is inserted into the insertion slot and engaged with the engaging device, so that the cover is securely fixed on the main body to cover the main body.

14 Claims, 7 Drawing Sheets

MOUSE WITH DETACHABLE COVER

FIELD OF THE INVENTION

The present invention relates to a mouse, and more particularly to a mouse with a detachable cover, which can be detached from the mouse by the user.

BACKGROUND OF THE INVENTION

With increasing development of science and technology and with the coming of the digital age, personal computers have become important working, learning and entertaining tools for most users. In addition, a mouse is one of the most popular computer input devices. The mouse can be used as a cursor control device for moving a cursor shown on a window of a display screen. Moreover, the user may press down click button of the mouse to trigger corresponding switches, thereby issuing various commands to the personal computer. Nowadays, wireless mouse devices have gradually become the mainstream in the market. In addition, various types of wireless mouse devices are disclosed to be selected by different users. However, each wireless mouse should be equipped with batteries for providing sufficient electric power to the wireless mouse.

Nowadays, for most wireless mouse devices, the battery cover is assembled by means of hooking elements and corresponding engaging grooves. Generally, the hooking elements and the engaging grooves are extended from the casing and the main body of the mouse and made of plastic material. As known, the plastic material has low elastic limit. After the mouse has been used for a period, the process of frequently disassembling and assembling the battery cover may break the battery cover. Under this circumstance, the reliability of the mouse is deteriorated. Moreover, if the battery cover is broken, the mouse may fail to be continuously operated.

For solving the above drawbacks, a novel mouse with a pair of magnetic elements is disclosed. These two magnetic elements are respectively disposed on the battery cover and the mouse main body, so that the magnetic element on the battery cover is magnetically attracted by the magnetic element on the mouse main body. However, since the price rise of the magnet fluctuates obviously, it is difficult for the manufacturers to manage the fabricating cost of the mouse. In addition, since it is not easy to acquire the source of the magnetic material, the complexity of acquiring the magnetic material in the production process is increased.

Therefore, for most mouse manufacturers, there is a need of providing a reliable and cost-effective mouse with a detachable cover.

SUMMARY OF THE INVENTION

The present invention provides a mouse with a detachable cover, in which an engaging device with an elastic element is engaged with the cover, so that the reliability of the engaging device is enhanced.

In accordance with an aspect of the present invention, there is provided a mouse with a detachable cover. The mouse includes a main body, an engaging device, and the cover. The main body has a top surface and an insertion slot. The insertion slot is recessed from the top surface of the main body. An accommodation space is defined within the main body. The engaging device is embedded within the accommodation space, and comprising a protrusion member. The protrusion member is located at an end of the engaging device and arranged beside the insertion slot. The protrusion member is partially received within the insertion slot. The cover is used for detachably covering the top surface of the main body. The cover has an extension arm, and the extension arm is protruded from the cover in a covering direction and inserted into the insertion slot of the main body. The extension arm has a receiving part. After the top surface of the main body is covered by the cover, the protrusion member of the engaging device is partially introduced into the receiving part of the extension arm, so that the engaging device and the cover are engaged with each other.

In an embodiment, the engaging device further includes a frame and an elastic element, wherein the elastic element is disposed within the frame, and a terminal of the elastic element is sustained against the protrusion member.

In an embodiment, the frame includes a perforation, wherein the protrusion member is clamped between the frame and the elastic element, and the protrusion member is partially protruded through the perforation.

In an embodiment, the protrusion member includes a base part and an arc-shaped protrusion part corresponding to the base part, wherein the elastic element is sheathed around the base part of the protrusion member, and the arc-shaped protrusion part is received within the receiving part.

In an embodiment, the protrusion member is a ball.

In an embodiment, the main body further includes at least one clamping part for clamping the engaging device within the accommodation space.

In an embodiment, the receiving part is a through-hole.

In accordance with an aspect of the present invention, there is provided a mouse with a detachable cover. The mouse includes a main body, an engaging device, and the cover. The main body has a top surface and two insertion slots, wherein the two insertion slots are recessed from the top surface of the main body, and an accommodation space is defined within the main body. The engaging device is engaging device within the accommodation space, and includes two protrusion members. The two protrusion members are respectively located at two ends of the engaging device and arranged beside the two insertion slots. The two protrusion members are partially received within the two insertion slots, respectively. The cover is used for detachably covering the top surface of the main body. The cover has two extension arms, and the two extension arms are protruded from the cover in a covering direction and respectively inserted into the two insertion slots of the main body. Each of the extension arms has a receiving part. After the top surface of the main body is covered by the cover, the two protrusion members of the engaging device are partially introduced into the two receiving parts, so that the engaging device and the cover are engaged with each other.

In an embodiment, the engaging device further includes a frame and an elastic element, wherein the elastic element is disposed within the frame, and two terminals of the elastic element are respectively sustained against the two protrusion member.

In an embodiment, the frame includes two perforations corresponding to the terminals of the elastic element. The two protrusion members are clamped between the frame and the elastic element. In addition, the two protrusion members are partially protruded through the corresponding perforations.

In an embodiment, each of the two protrusion members includes a base part and an arc-shaped protrusion part corresponding to the base part, wherein the elastic element is sheathed around the base part of the protrusion member, and the arc-shaped protrusion part is received within the corresponding receiving part.

In an embodiment, each of the two protrusion members is a ball.

In an embodiment, the main body further includes at least one clamping part for clamping the engaging device within the accommodation space.

In an embodiment, the receiving part is a through-hole

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a mouse with a detachable cover. The present invention will now be described more specifically with reference to the following embodiments. It is to be noted that the number and locations of all components in these preferred embodiments of this invention are presented herein for purpose of illustration and description only. It is not intended to be exhaustive or to be limited to the precise form disclosed.

Figure 1:
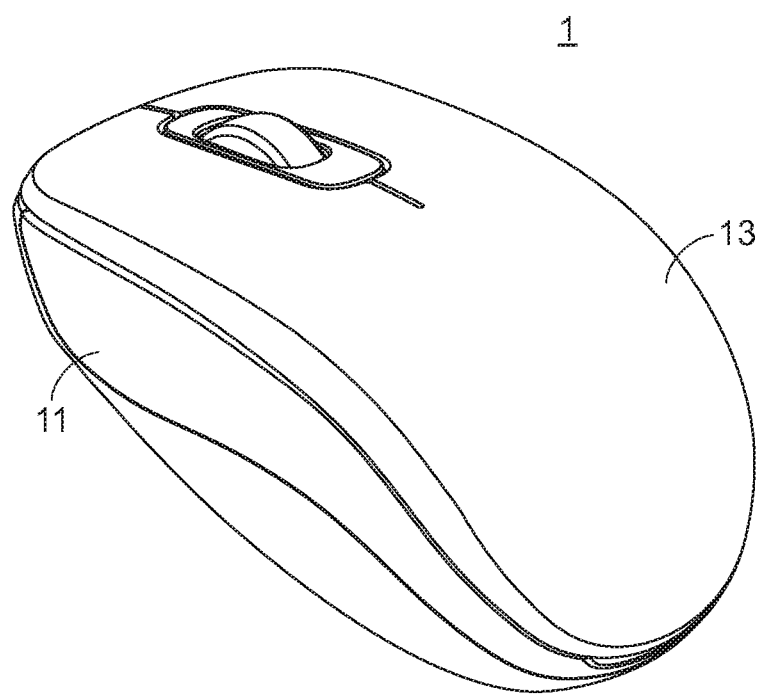
FIG. 1 is a schematic perspective view illustrating a mouse with a detachable cover according to a first embodiment of the present invention.
Figure 2:
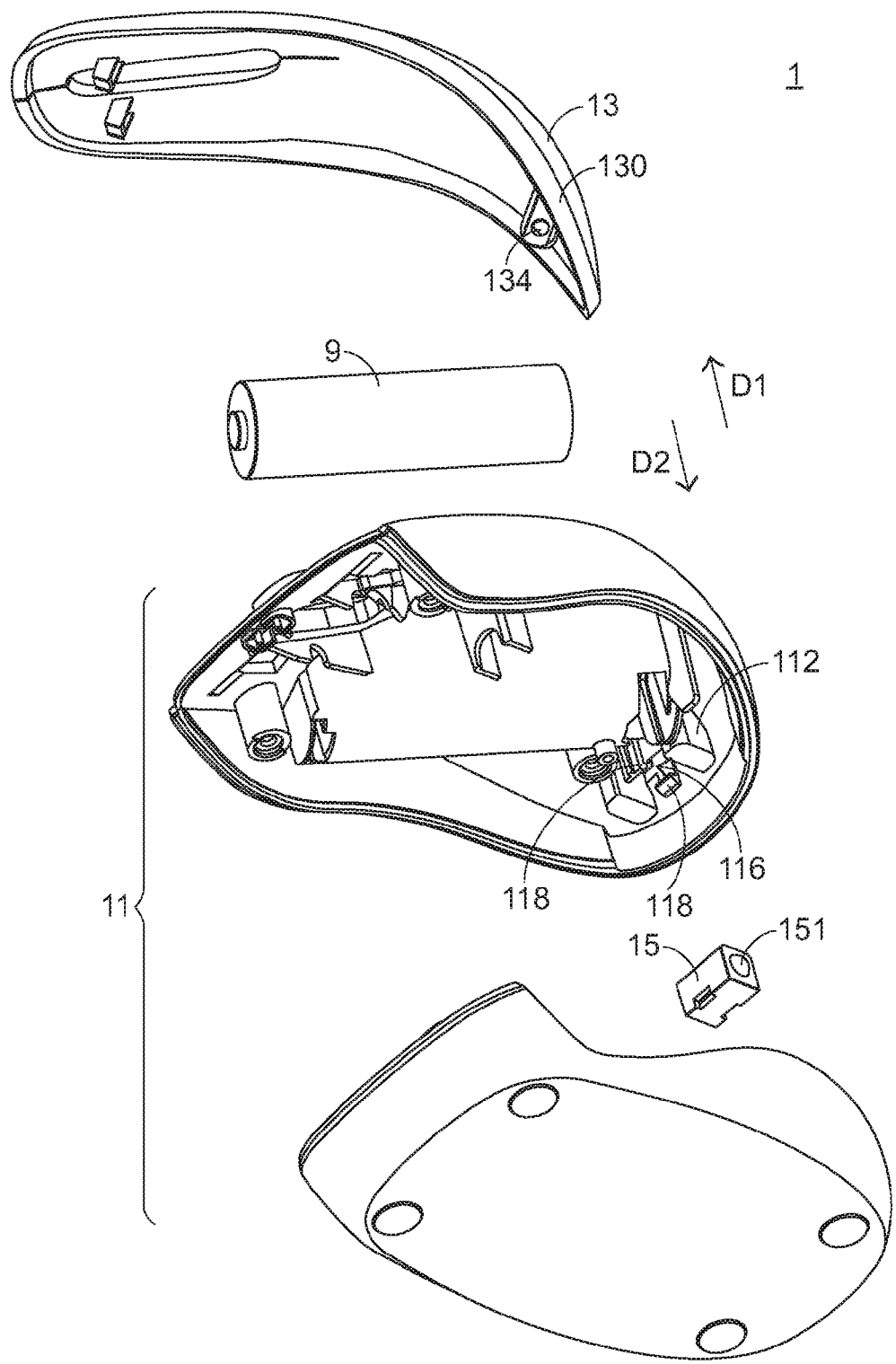
FIG. 2 is a schematic exploded view illustrating the mouse according to the first embodiment of the present invention.
Figure 3:
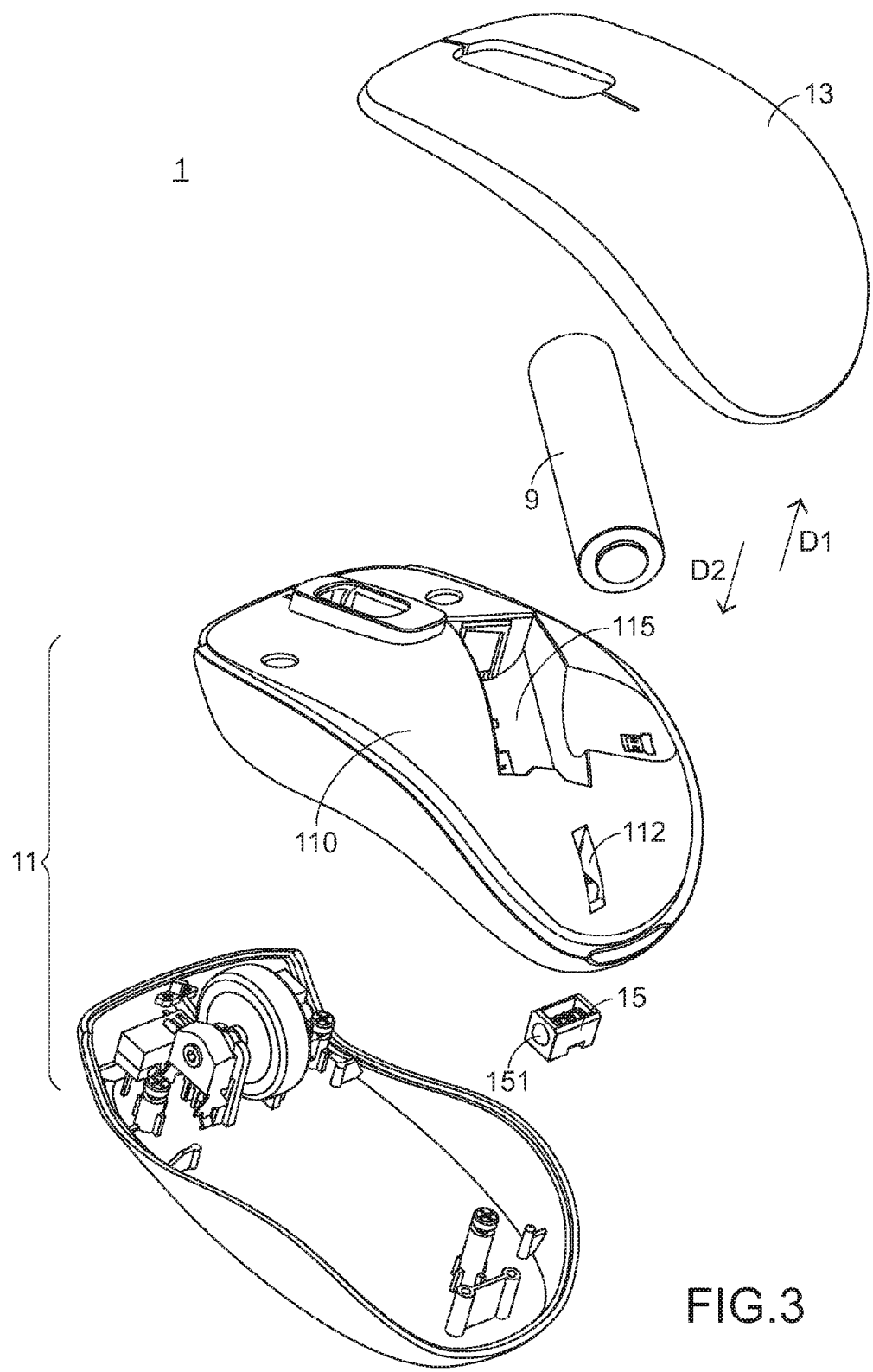
FIG. 3 is a schematic exploded view illustrating the mouse according to the first embodiment of the present invention and taken along another viewpoint.
Figure 4:
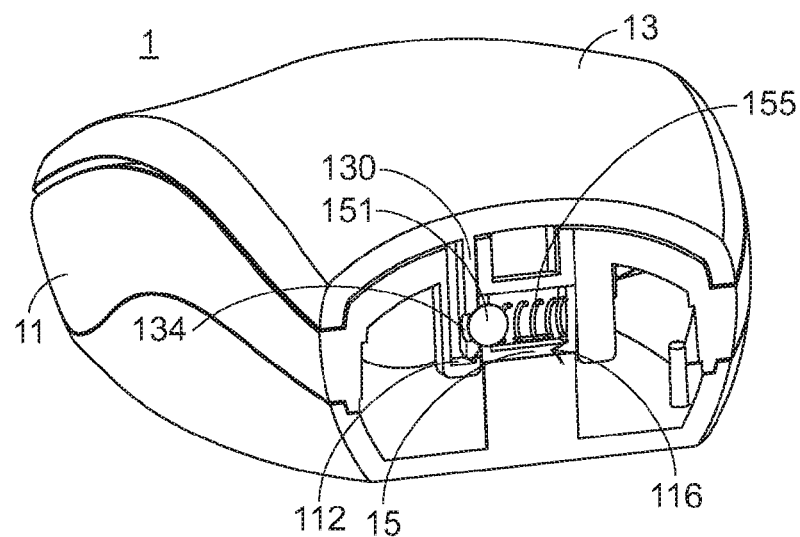
FIG. 4 is a schematic cutaway view illustrating the mouse according to the first embodiment of the present invention.

FIG. 1 is a schematic perspective view illustrating a mouse with a detachable cover according to a first embodiment of the present invention. FIG. 2 is a schematic exploded view illustrating the mouse according to the first embodiment of the present invention. FIG. 3 is a schematic exploded view illustrating the mouse according to the first embodiment of the present invention and taken along another viewpoint. FIG. 4 is a schematic cutaway view illustrating the mouse according to the first embodiment of the present invention. Please refer to FIGS. 1-4. The mouse 1 comprises a main body 11, an engaging device 15, and a cover 13. The main body 11 has a top surface 110 and an insertion slot 112. The cover 13 is detachably connected with the top surface 110 of the main body 11. Moreover, the main body 11 of the mouse 1 further comprises a battery receptacle 115. The battery receptacle 115 is used for accommodating a battery 9. The battery 9 is used to provide electric power required for operation of the mouse. Since the cover 13 is detachably connected with the top surface 110 of the main body 11, if the user wants to remove the battery 9 from the battery receptacle 115 and replace the battery 9 with a new one, the cover 13 should be detached from the top surface 110 of the main body 11 in a detaching direction D1. After the battery 9 is well installed, the cover 13 is connected with the top surface 110 of the main body 11 along a covering direction D2. After the top surface 110 of the main body 11 is covered by the cover 13, the battery receptacle 115 is also covered by the cover 13. Consequently, in a case that the mouse 1 is moved during operation, the possibility of falling down the battery 9 from the battery receptacle 115 will be minimized.

Please refer to FIGS. 2, 3 and 4. The engaging device 15 of the mouse 1 is disposed within an accommodation space 116, which is defined within the main body 11. Preferably, the main body 11 of the mouse 1 has at least one clamping part 118 for clamping the engaging device 15 within the accommodation space 116 in order to securely fix the engaging device 15 on the main body 11. On the other hand, the insertion slot 112 is recessed from the top surface 110 of the main body 11. In addition, the cover 13 has an extension arm 130, which is extended from an inner surface of the cover 13. After the main body 11 is covered by the cover 13, the extension arm 130 is inserted into the insertion slot 112, and thus the position of the extension arm 130 is limited by the insertion slot 112. Moreover, the engaging device 15 comprises a protrusion member 151. The protrusion member 151 is located at an end of the engaging device 15, and arranged beside the insertion slot 112. Consequently, the protrusion member 151 is at least partially received within the insertion slot 112. Moreover, the extension arm 130 has a receiving part 134. The location of the receiving part 134 corresponds to the location of the protrusion member 151, so that the protrusion member 151 is receivable by the receiving part 134. Consequently, after the extension arm 130 is inserted into the insertion slot 112 of the extension arm 130, the protrusion member 151 of the engaging device 15 is introduced into the receiving part 134 of the extension arm 130. In such way, the engaging device 15 and the extension arm 130 are engaged with each other to prevent the extension arm 130 from being detached in the detaching direction D1, wherein the detaching direction D1 is opposed to the covering direction D2.

Figure 5:
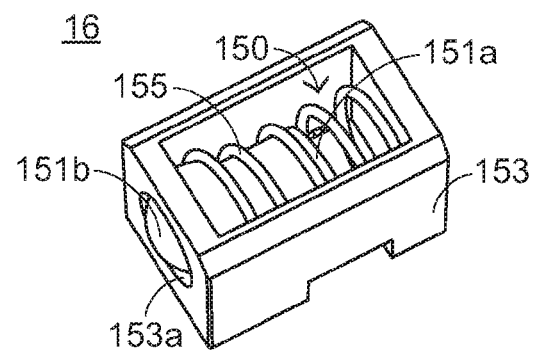
FIG. 5 is a schematic perspective view illustrating a first exemplary engaging devices used in the mouse according to the first embodiment of the present invention.
Figure 6:
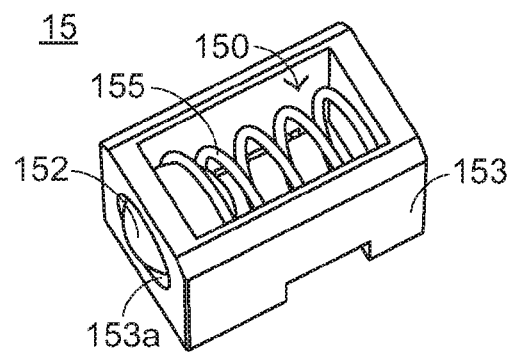
FIG. 6 is a schematic perspective view illustrating a second exemplary engaging devices used in the mouse according to the first embodiment of the present invention.
Figure 7:
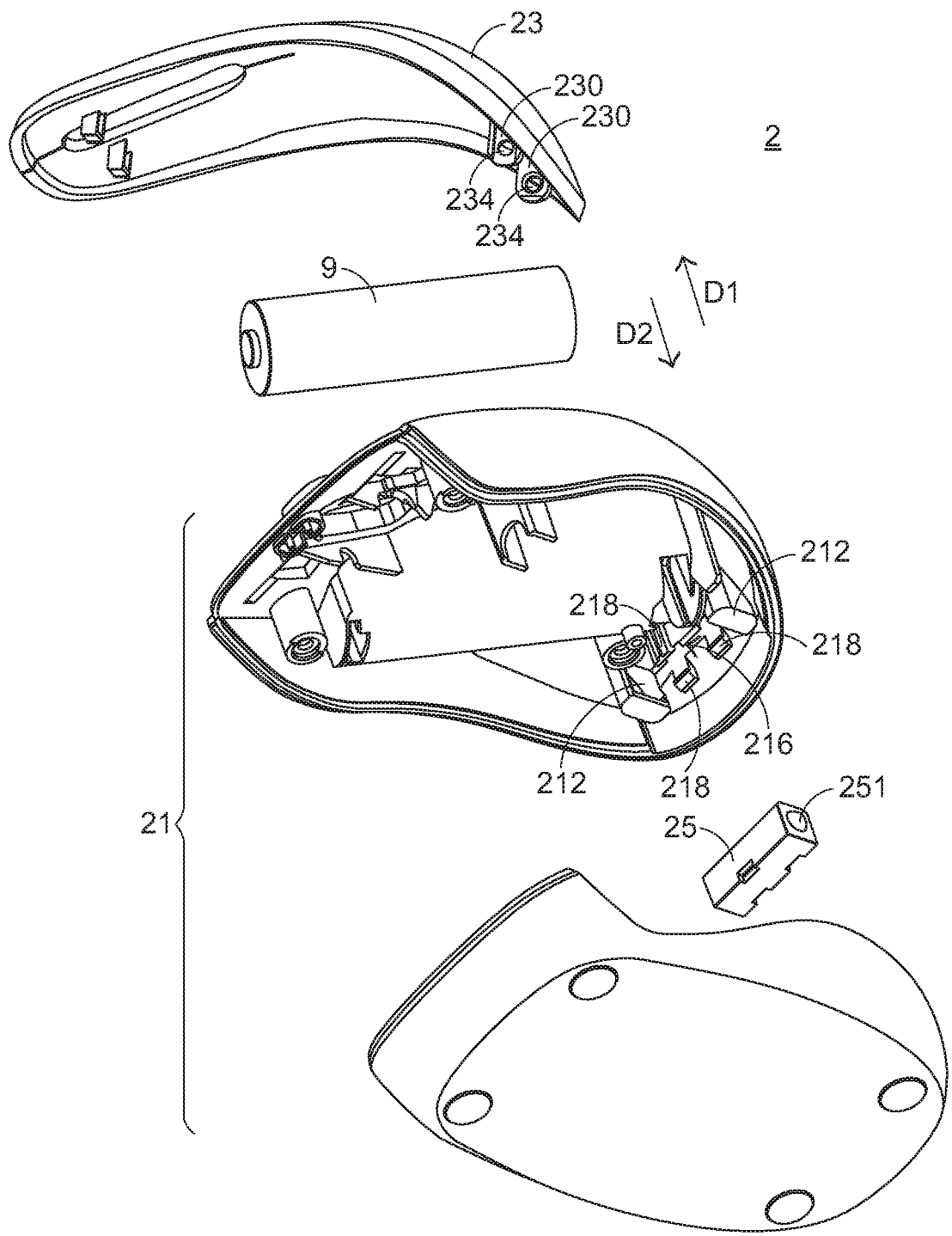
FIG. 7 is a schematic exploded view illustrating a mouse with a detachable cover according to a second embodiment of the present invention.
Figure 8:
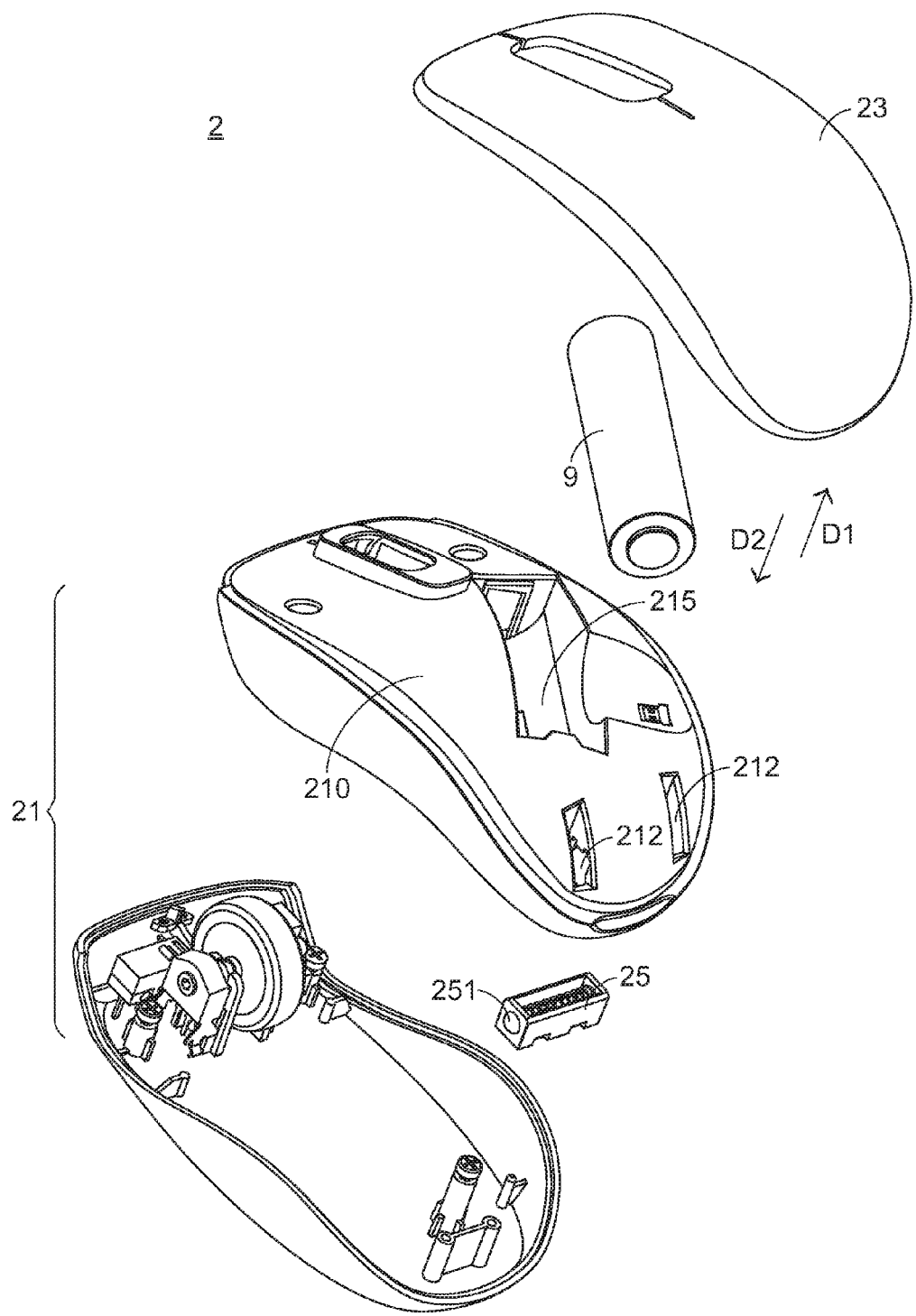
FIG. 8 is a schematic exploded view illustrating the mouse according to the second embodiment of the present invention and taken along another viewpoint.
Figure 9:
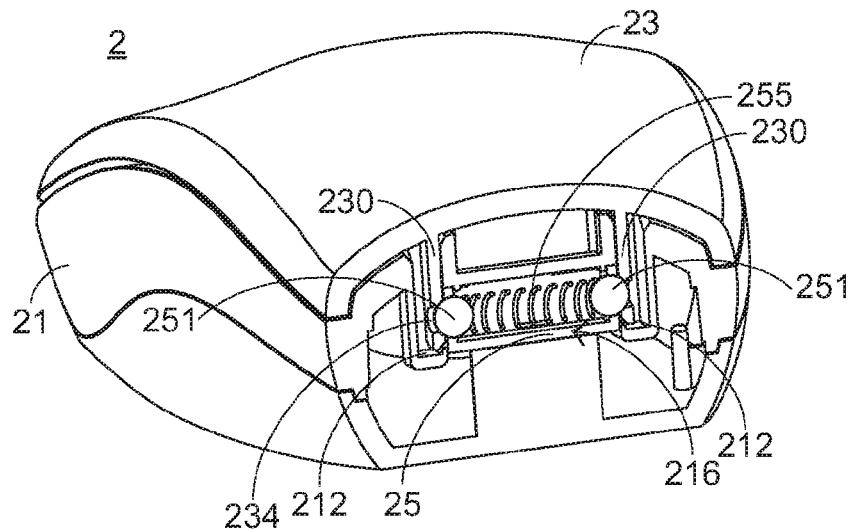
FIG. 9 is a schematic cutaway view illustrating the mouse according to the second embodiment of the present invention.

FIGS. 5 and 6 are schematic perspective views illustrating two exemplary engaging devices used in the mouse according to the first embodiment of the present invention. Please refer to FIGS. 2~6. Each of the engaging devices 15 and 16 further comprises a frame 153 and an elastic element 155. An inner space 150 is defined within the frame 153. The elastic element 155 is disposed within the inner space 150. The frame 153 has a perforation 153a. The perforation 153a is located at an end of the frame 153 and in communication with the insertion slot 112. It is noted that the cross section area of the perforation 153a is smaller than the maximum cross section area of the protrusion member 151. Consequently, the position of the protrusion member 151 is limited by the frame 153, a portion of the protrusion member 151 is accommodated within the inner space 150, and another portion of the protrusion member 151 is penetrated through the perforation 153a. The portion of the protrusion member 151 penetrated through the perforation 153a is just engaged with the receiving part 134 of the extension arm 130. In the first embodiment, the elastic element 155 has two terminals. A first end of the elastic element 155 is sustained against the frame 153. A second end of the elastic element 155 is sustained against a surface of the protrusion member 151. In such way, the protrusion member 151 is clamped between the frame 153 and the elastic element 155. During the extension arm 130 is inserted into the insertion slot 112, the front end of the extension arm 130 is sustained against the protrusion member 151, so that the protrusion member 151 is pushed toward the frame 153 and left from an initial position. After the extension arm 130 is completely inserted into the insertion slot 112, the protrusion member 151 is returned to the initial position and introduced into the receiving part 134 of the extension arm 130.

In other words, FIGS. 5 and 6 illustrate the profiles of two exemplary protrusion members used in the mouse according to the first embodiment of the present invention are shown in. In the profiles of the first exemplary protrusion member, the protrusion member 151 comprises a base part 151a and an arc-shaped protrusion part 151b (see FIG. 5). The maximum cross section area of the arc-shaped protrusion part 151b is larger than the cross section area of the perforation 153a. Consequently, the position of the arc-shaped protrusion part 151b is limited by the frame 153, and only a portion of the arc-shaped protrusion part 151b is penetrated through the perforation 153a. In addition, the elastic element 155 is sheathed around the base part 151a of the protrusion member 151, so that the protrusion member 151 is securely connected with the elastic element 155. Consequently, after the main body 11 is covered by the cover 13 and the extension arm 130 is inserted into the insertion slot 112 of the main body 11, the arc-shaped protrusion part 151b is partially penetrated through the perforation 153a and introduced into the receiving part 134. Consequently, the protrusion member 151 and the extension arm 130 are engaged with each other to prevent the extension arm 130 from being detached in the detaching direction D1.

In the profiles of the second exemplary protrusion member, the protrusion member 151 is substantially a ball 152 (see FIG. 6). Like the first exemplary protrusion member 151, the maximum cross section area of the ball 152 is larger than the cross section area of the perforation 153a. Consequently, the position of the ball 152 is limited by the frame 153, and only a portion of the ball 152 is penetrated through the perforation 153a. Please also refer to FIG. 4. After the main body 11 is covered by the cover 13 and the extension arm 130 is inserted into the insertion slot 112 of the main body 11, the ball 152 is partially penetrated through the perforation 153a and introduced into the receiving part 134. Consequently, the protrusion member 151 and the extension arm 130 are engaged with each other to prevent the extension arm 130 from being detached in the detaching direction D1. However, those skilled in the art will readily observe that numerous modifications and alterations of the connecting way and shape of the protrusion member 151 may be made while retaining the teachings of the invention. The two exemplary protrusion members are presented herein for purpose of illustration and description only.

In this embodiment, the receiving part 134 corresponding to the protrusion member 151 is a through-hole or a recess for receiving the protrusion member 151, thereby preventing detachment of the extension arm 130. Since the cover 13 is detachably connected with the top surface 110 of the main body 110, if the user wants to remove the battery 9 from the battery receptacle 115 and replace the battery 9 with a new one, an external force may be applied to cover 13 in the detaching direction D1. In response to the external force, the protrusion member 151 is pushed by the extension arm 130, so that the protrusion member 151 is moved in a direction toward the accommodation space 116. In such way, the extension arm 130 is detached from the extension arm 130, and thus the cover 13 is removed from the top surface 110 of the main body 11.

Hereinafter, a mouse with a detachable cover according to a second embodiment of the present invention will be illustrated with reference to FIGS. 7~11. The mouse of the second embodiment is substantially identical to the mouse of the first embodiment except that the number and locations of some components are changed to increase the overall structural strength of the mouse more securely. Please refer to FIGS. 7~9. The main body 21 has a top surface 210 and two insertion slots 212. The two insertion slots 212 are recessed from the top surface 210 of the main body 21. The engaging device 25 is disposed within an accommodation space 216, which is defined within the main body 21. The two ends of the engaging device 25 are arranged beside the two insertion slots 212, respectively. In addition, the engaging device 25 comprises two protrusion members 251, which are respectively located at the two ends of the engaging device 25. Consequently, the protrusion members 251 are at least partially received within the insertion slots 212, respectively. In addition, the cover 23 has two extension arms 230, which are extended from an inner surface of the cover 23. The two extension arms 230 are respectively inserted into the insertion slots 212 of the main body 21. Moreover, each of the extension arms 230 has a receiving part 234. After the top surface 210 of the main body 21 is covered by the cover 23, the two protrusion members 251 of the engaging device 25 are respectively introduced into the two receiving parts 234, so that the two protrusion members 251 are engaged with the two extension arms 230. In such way, the cover 23 and the engaging device 25 are engaged with each other.

Figure 10:
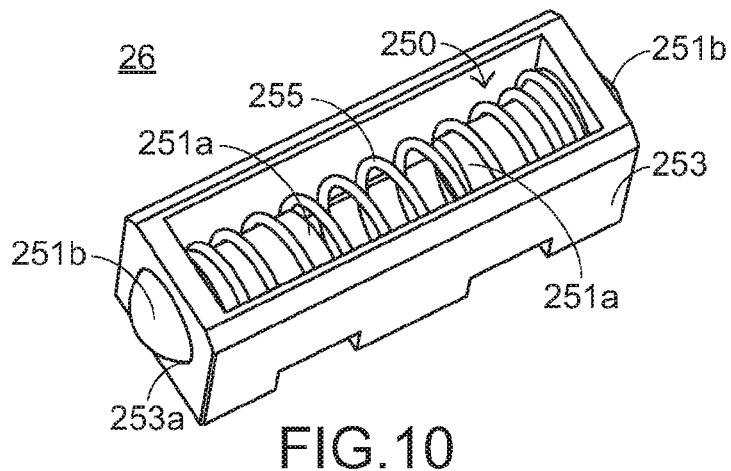
FIG. 10 is a schematic perspective view illustrating a first exemplary engaging devices used in the mouse according to the second embodiment of the present invention.
Figure 11:
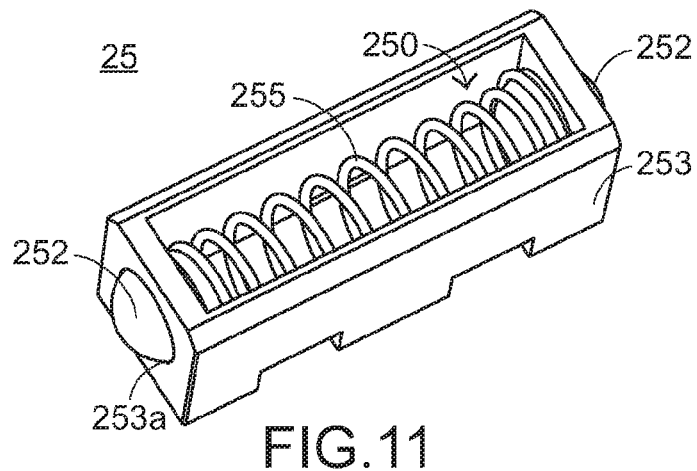
FIG. 11 is a schematic perspective view illustrating a second exemplary engaging devices used in the mouse according to the second embodiment of the present invention.

FIGS. 10 and 11 are schematic perspective views illustrating two exemplary engaging devices used in the mouse according to the first embodiment of the present invention. Each of the engaging devices 25 and 26 further comprises a frame 253 and an elastic element 255. An inner space 250 is defined within the frame 253. The elastic element 255 is disposed within the inner space 250. The frame 253 has two perforations 253a. The two perforations 253a are located at tow opposite ends of the frame 253. In addition, the two perforations 253a are in communication with the inner space 250. It is noted that the cross section area of the perforation 253a is smaller than the maximum cross section area of the corresponding protrusion member 251. Consequently, the position of each protrusion member 251 is limited by the frame 253, a portion of the protrusion member 251 is accommodated within the inner space 250, and another portion of the protrusion member 251 is penetrated through the corresponding perforation 253a. In the second exemplary engaging device 26, the elastic element 255 is disposed within the frame 253, and the two opposite terminals of the elastic element 255 are externally sustained against the two protrusion members 251, respectively. Consequently, the protrusion members 251 are clamped between the frame 253 and the elastic element 255. The detailed configurations of other components (e.g. the clamping part) of the mouse of the second embodiment are similar to those of the first embodiment, and are not redundantly described herein.

From the above description, the present invention provides a mouse with a detachable cover. The mouse includes an engaging device with an elastic element. Due to the engagement between the engaging device and the extension arm protruded from the main body, the conventional problems of causing breakdown of the battery cover from material fatigue of plastic material after a long use time will be minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse with a detachable cover, said mouse comprising:
   a main body having a top surface and an insertion slot, wherein said insertion slot is recessed from said top surface of said main body, and an accommodation space is defined within said main body;
   an engaging device embedded within said accommodation space, and the engaging device comprising a protrusion member, wherein said protrusion member is located at an end of said engaging device and arranged beside said insertion slot, wherein said protrusion member is partially received within said insertion slot; and
   a cover for detachably covering said top surface of said main body, wherein said cover has an extension arm, and said extension arm is protruded from said cover in a covering direction and inserted into said insertion slot of said main body, wherein said extension arm has a receiving part,
   wherein after said top surface of said main body is covered by said cover, said protrusion member of said engaging device is partially introduced into said receiving part of said extension arm, so that said engaging device and said cover are engaged with each other.

2. The mouse according to claim 1, wherein said engaging device further comprises a frame and an elastic element, wherein said elastic element is disposed within said frame, and a terminal of said elastic element is sustained against said protrusion member.

3. The mouse according to claim 2, wherein said frame comprises a perforation, wherein said protrusion member is clamped between said frame and said elastic element, and said protrusion member is partially protruded through said perforation.

4. The mouse according to claim 3, wherein said protrusion member comprises a base part and an arc-shaped protrusion part corresponding to said base part, wherein said elastic element is sheathed around said base part of said protrusion member, and said arc-shaped protrusion part is received within said receiving part.

5. The mouse according to claim 3, wherein said protrusion member is a ball.

6. The mouse according to claim 3, wherein said main body further comprises at least one clamping part for clamping said engaging device within said accommodation space.

7. The mouse according to claim 3, wherein said receiving part is a through-hole.

8. A mouse with a detachable cover, said mouse comprising:
   a main body having a top surface and two insertion slots, wherein said two insertion slots are recessed from said top surface of said main body, and an accommodation space is defined within said main body;
   an engaging device embedded within said accommodation space, and comprising two protrusion members, wherein said two protrusion members are respectively located at two ends of said engaging device and arranged beside said two insertion slots, wherein said two protrusion members are partially received within said two insertion slots, respectively; and
   a cover for detachably covering said top surface of said main body, wherein said cover has two extension arms, and said two extension arms are protruded from said cover in a covering direction and respectively inserted into said two insertion slots of said main body, wherein each of said extension arms has a receiving part,
   wherein after said top surface of said main body is covered by said cover, said two protrusion members of said engaging device are partially introduced into said two receiving parts, so that said engaging device and said cover are engaged with each other.

9. The mouse according to claim 8, wherein said engaging device further comprises a frame and an elastic element, wherein said elastic element is disposed within said frame, and two terminals of said elastic element are respectively sustained against said two protrusion member.

10. The mouse according to claim 9, wherein said frame comprises two perforations corresponding to said terminals of said elastic element, wherein said two protrusion members are clamped between said frame and said elastic element, wherein said two protrusion members are partially protruded through said corresponding perforations.

11. The mouse according to claim 10, wherein each of said two protrusion members comprises a base part and an arc-shaped protrusion part corresponding to said base part, wherein said elastic element is sheathed around said base part of said protrusion member, and said arc-shaped protrusion part is received within said corresponding receiving part.

12. The mouse according to claim 10, wherein each of said two protrusion members is a ball.

13. The mouse according to claim 10, wherein said main body further comprises at least one clamping part for clamping said engaging device within said accommodation space.

14. The mouse according to claim 10, wherein said receiving part is a through-hole.

* * * * *